Feb. 25, 1936.  F. R. KEMMER  2,032,215
METHOD OF AND APPARATUS FOR TREATING DISCRETE PARTICLES AND VAPORS
Filed Feb. 14, 1934  2 Sheets-Sheet 1
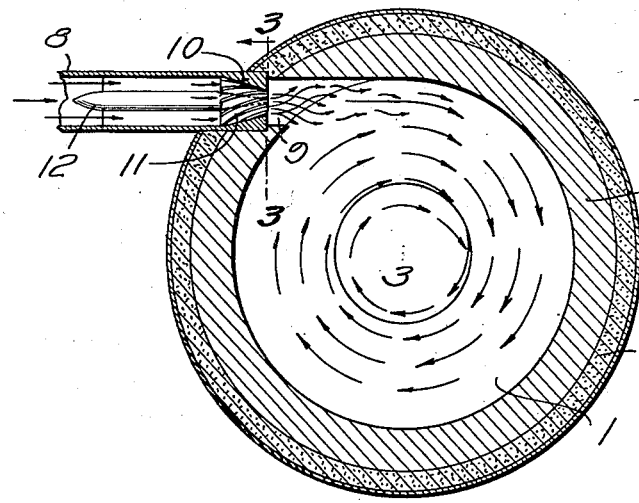
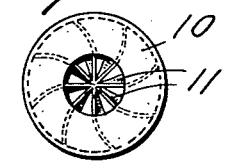
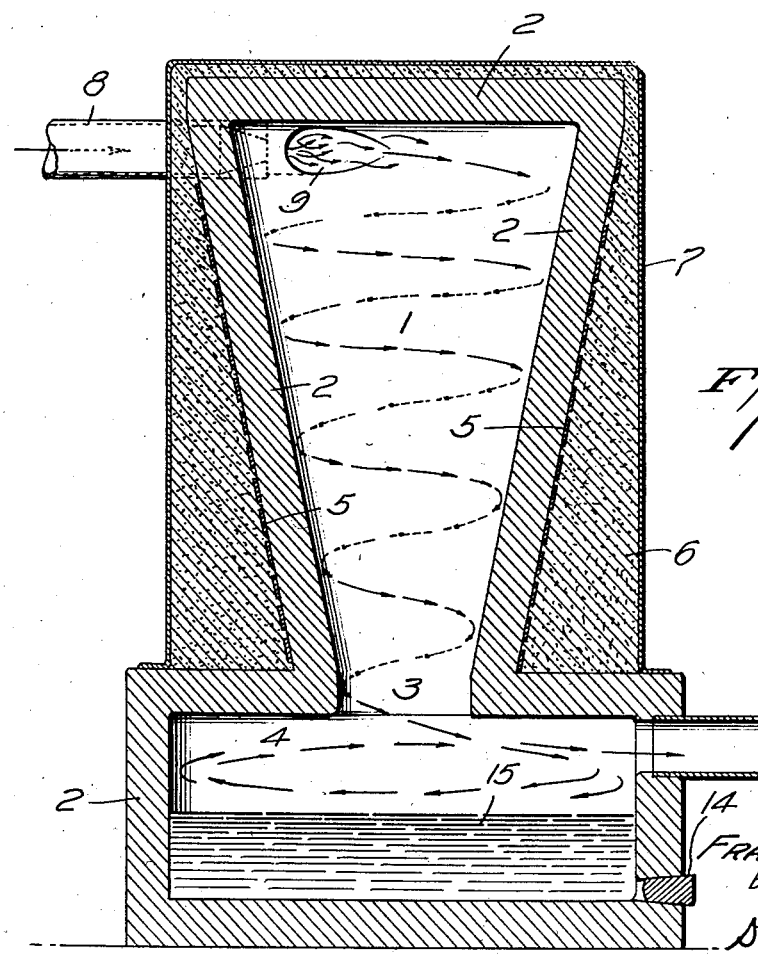
INVENTOR.
FRANK R. KEMMER,
BY
ATTORNEY.

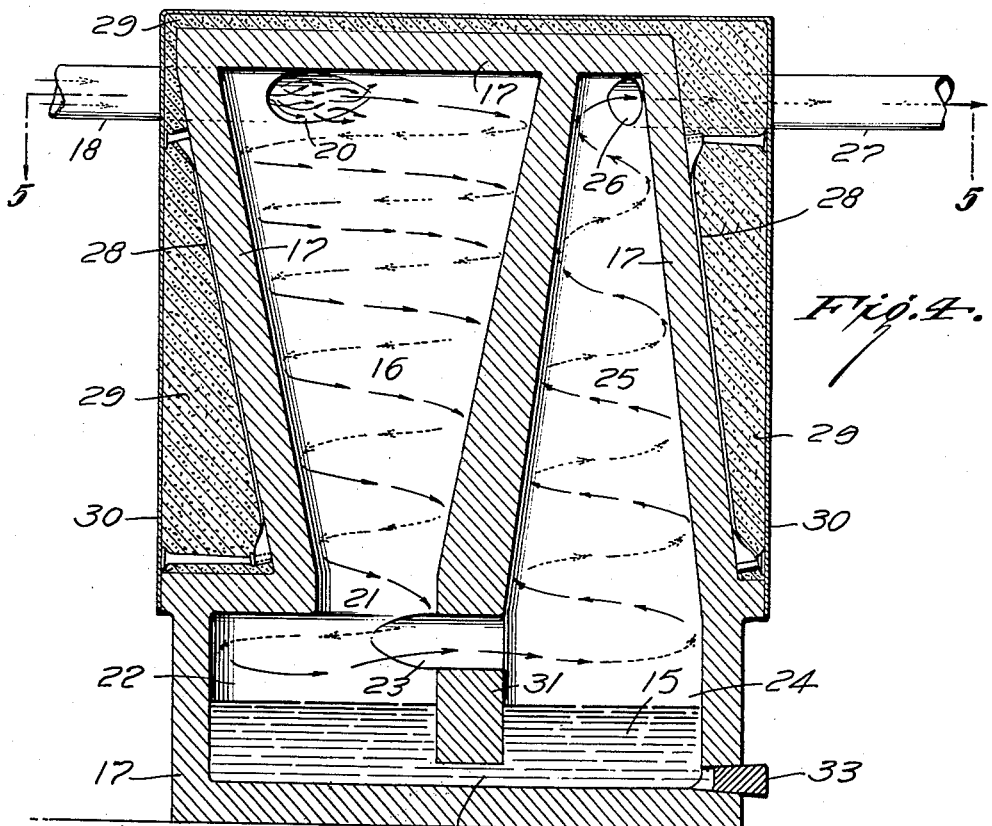
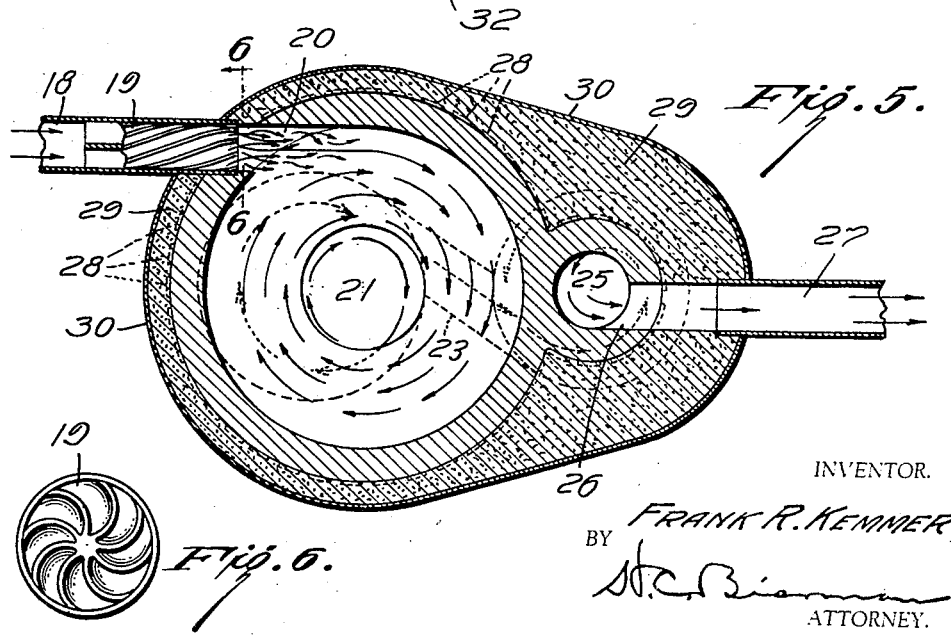

Patented Feb. 25, 1936

2,032,215

UNITED STATES PATENT OFFICE 2,032,215

METHOD OF AND APPARATUS FOR TREATING DISCRETE PARTICLES AND VAPORS

Frank R. Kemmer, Larchmont, N. Y., assignor to Magnesium Products, Inc., Pittsburgh, Pa., a corporation of Delaware Application February 14, 1934, Serial No. 711,114

18 Claims. (Cl. 75—17)

This invention relates to a method of and apparatus for the conversion of substances of organic and inorganic nature into a massive, coherent form, and is directed to the conversion of finely divided or discrete metallic particles to a coherent or massive condition.

My invention contemplates the treatment of discrete particles at a relatively high temperature and usually contained in a gaseous or vaporous transporting medium.

It is among the objects of the present invention to effect the treatment of discrete particles or powder of metals, for example, particularly in admixture with gases and/or vapors, whereby the same may be liquefied in a simple and expeditious manner.

For example, in the production of certain metals from their ores, more particularly from their oxide ores, the metals are produced at a temperature above the boiling point of these metals and are hence initially released in the vapor phase.

Where a carbonaceous reducing agent has been used the metallic vapors are evolved in admixture with carbon monoxide gas or in admixture with carbon monoxide and carbon dioxide depending among other features, upon the temperature of reduction. Generally the amount of carbon dioxide present is in small amount but the amount of carbon monoxide may be relatively large as in the reduction of the oxides of magnesium, zinc, phosphorus and the like. The vapors of metals being monatomic, the release of magnesium and zinc vapors by reduction of their oxides with carbon takes place in the presence of an equal volume of carbon monoxide gas.

In some instances the presence of carbon monoxide mixed with metallic vapor interferes with and indeed may completely frustrate the condensation of the metallic vapor to coherent metal in the liquid or solid phase. This is particularly true in the case of magnesium where efforts directed to the direct condensation to coherent form of magnesium vapor in admixture with carbon monoxide gas have completely failed due to the oxidizing action of the carbon monoxide on magnesium. This action on magnesium is pronounced and extremely rapid when the mixture of metallic vapor and carbon monoxide has fallen to a temperature below that at which magnesium is liberated from its oxide ores by carbon.

The preservation of magnesium against oxidation by carbon monoxide during condensation requires that the mixture be chilled with extreme rapidity and for efficient and economical results the chilling must be practically instantaneous.

Various means have been proposed for satisfactorily accomplishing this result, as for example, in my application Serial No. 664,932, filed April 7, 1933, but the metallic magnesium condensate thereby produced is in discrete or finely divided form. This finely divided magnesium powder requires additional treatment in order that the metal may be recovered in coherent and commercial form.

Certain methods for accomplishing this desirable result are disclosed in application Serial No. 664,933, entitled "A method of producing liquid magnesium", and Serial No. 542,104 entitled "A method of producing magnesium", wherein it is disclosed that finely divided magnesium powder may be converted into liquid metal by subjecting said powder, in the presence of an inert or reducing gas and under suitable temperature conditions, to frictional effects to cause coalescence of the metallic particles to liquid form and if so desired to vaporize the metal and suitably condense said metallic vapor.

Although the methods disclosed in application Serial No. 664,933 yield satisfactory results, I have found it desirable and possible to simplify the methods disclosed therein to the end that the initial investment in plant facilities is materially decreased, and the operating control, yields and operating and maintenance costs are improved.

According to this invention I have found it advantageous to utilize in place of the rotating device with its interior mounted electrodes shown in application Serial No. 664,933, means which are more simple and at the same time more effective. I have found that it is possible to use stationary apparatus with excellent results. I have also found it possible to eliminate electrodes mounted within the walls of the converting apparatus and to thereby save the heat conduction losses through the ends of the electrodes. Various other advantages accrue from the elimination of electrodes and rotating apparatus. For example, I thereby eliminate many electrical connections, particularly those of the slip ring type with massive brushes which required occasional stoppages for repairs and replacement and the attendant cost thereof. Of particular importance is the great improvement in the matter of maintaining a high degree of vacuum in the system by virtue of the elimination of sources of leakage as for example at the junction of the rotating device with its powder storage and feeding system and at the various points where the electrodes protruded through the walls of the rotating device.

The basis of my invention consists in using stationary apparatus maintained at a temperature below the normal boiling point of the substance being treated, such as magnesium, preferably by the use of electric heating means whereby the temperature gradient between the heating element or elements and the wall to be heated is kept at a minimum. One manner of accomplishing this is by the use of heating elements in the form of flat strips wherein the surface is large relative to the cross-sectional area thereof and for this I find nichrome or high chromium-nickel alloys quite satisfactory, but of course any other suitable material may be used. Likewise, heating means other than electric may be used.

I then blow or inject into the said heated chamber, usually but not necessarily by means of an inert or reducing gas preferably but not necessarily preheated, such as hydrogen, helium, argon and the like, the magnesium powder or the like, which is transported by and maintained in suspension therein. The gas enters said heated chamber preferably in a tangential or circumferential manner so as to produce a whirling motion and subjecting the particles to a high velocity and to the action of centrifugal forces which throw the particles into contact with the heated walls of the chamber causing said particles to be brought to the liquid state above the melting point of the metal and to cause them to coalesce under the frictional or rubbing effects which they undergo among themselves or between themselves and the walls of said chamber.

In a similar manner metallic vapors such as magnesium, for example, usually without the aid of an additional transporting gas, may be treated to give the coherent metal.

Liquefaction of the vapor or powder may take place within the chamber, the droplets being covered with films either of oxide or other compound or metal held by surface tension. These droplets are subjected to a swirling motion, centrifugal action or the force of gravity, and preferably to a combination of two or more of these forces. Thereby the droplets are forced against the chamber walls and against each other, resulting in rupture of the films of the droplets and causing them to coalesce to coherent form.

Although I find that a tubular chamber of uniform diameter gives satisfactory results in converting powder to liquid, I have discovered that I obtain greater liquefying capacity (per unit of volume of the apparatus) if the chamber is of diminishing diameter or is of inverted truncated conical section. With the interior of the liquefying chamber shaped in this manner and when causing the gas and powder in suspension therein to enter tangentially at the larger end of the tube and to be subjected to a progressively increasing velocity and centrifugal action as it passes through the tube, the rate of liquefaction per unit of surface and volume is considerably increased and in this case there is little or no opportunity for the particles to pass through the tube in an unconverted or unliquefied condition.

In the accompanying drawings constituting a part hereof and in which like reference characters indicate like parts Figure 1 is a horizontal cross-sectional view of one form of apparatus constructed in accordance with my invention;

Figure 2 is a vertical cross-sectional view thereof;

Figure 3 is a view taken along the line 3—3 of Figure 1;

Figure 4 is a vertical cross-sectional view of a modified form of apparatus made in accordance with the present invention;

Figure 5 is a horizontal cross-sectional view thereof taken along the line 5—5 of Figure 4; and Figure 6 is an enlarged detailed view taken along the line 6—6 of Figure 5.

The apparatus as shown in Figures 1, 2 and 3 consists essentially of a chamber 1 which is generally in the shape of an inverted frustrum of a cone. The walls 2 thereof are made of suitable refractory material and the lower opening 3 in the chamber 1 communicates with an enlarged chamber 4, the walls of which are also formed of the refractory material 2.

Around the outer walls of chamber 1 are placed a series of electrically conducting members 5 of suitable material such as nichrome and adapted for maintaining the temperature of the chamber 1 at a desired temperature by an electrical current passing through resistor elements 5. There is provided a layer 6 of heat insulating material to minimize heat losses from the chamber 1 and a shell 7 holds said material in place. This shell or housing may be constructed so as to give greater or less thickness of insulating material around the chamber and between the topmost and lowest parts thereof.

An inlet pipe 8 for the introduction of a gaseous material containing discrete particles or of a vapor into the chamber is so placed that the inner end thereof opens into the chamber at point 9 substantially tangential thereto. The inner end 10 of pipe 8 is tapered and is provided with a device 11 having a series of inclined plates which imparts a swirling action to the gases passing therethrough. A central member 12 acts as a guide for the gases passing to device 11. There is further provided an exit pipe 13 from chamber 4 for the removal of residual gases and a plug 14 which may be removed for draining the liquid 15 which may accumulate in said chamber.

In the operation of the device a gaseous mixture containing discrete particles of material to be condensed or liquefied, such as magnesium, and at suitable temperature is caused to flow past device 11 where it is given a swirling motion, whereby the particles are caused to impinge upon the walls 2 of the chamber 1, and there is imparted thereto a rolling action along said walls. In this case there is friction, due to the swirling motion and the centrifugal action of the particles in moving along the walls and rubbing upon each other. This action is augmented by the action of gravity, which tends to impart a vertically downward motion to the particles, in combination with the tapering walls which tend to resist the action of gravity and thus causes additional friction, the result being that liquefaction takes place. The course of the movement is shown by the arrows on Figures 1 and 2.

When treating a mixture of a vapor with a transporting gas, by reason of the progressively decreasing diameter of the chamber 1, contraction of the mixture of gas and vapor by cooling and condensation which results in a decrease in velocity, is compensated for to any desired extent, even to the point of producing a progressive increase in the velocity of the gas whereby increased frictional effects are obtained and the efficiency of the apparatus is increased. The liquid formed on the walls flows through opening 3 and accumulates in the bottom of the chamber 4. The residual gases also pass into chamber 4 where by reason of the larger volume sudden expansion thereof takes place, together with a reduction in the velocity whereby liquefaction of vapors remaining in the gases will take place. The residual gases then pass out of the system through pipe 13.

In case the apparatus is used for the treatment of vapors to be recovered in coherent form, said vapors either alone or mixed with a gas are introduced into chamber 1 where liquefaction or solidification to provide discrete particles may take place in the chamber, and said particles are then subjected to the frictional action along the walls, as described above. Or the vapors may impinge directly upon the walls of the chamber and be cooled and liquefied simultaneously, to give a coherent body.

In the embodiment shown in Figures 4, 5 and 6 I make use of substantially the same principles and provide a chamber 16 having walls 17 of suitable refractory material quite similar to chamber 1 and walls 2. A device 19 having inclined blades is inserted in the pipe 18 which gives a swirling action to the gases as they enter tangentially into chamber 16 at point 20.

The lower end of chamber 16 is provided with an opening 21 leading into chamber 22 which in turn has an opening 23 so placed that gases passing therethrough are given a motion tangential to chamber 24. Above the latter chamber is another chamber 25 in the form of a frustrum of a cone which tapers inwardly and upwardly and which terminates in an exit opening 26 in a tangential position to chamber 25 and communicating with the exit pipe 27 for spent gases.

The chambers 16 and 25 are provided with electrical resistance elements 28 placed vertically and suitably connected to a source of current. The chambers are surrounded by heat insulating materials 29 and a shell 30 holds the same in place. Chambers 22 and 24 are separated by a partition 31 which extends to a point near the bottom leaving a space 32, whereby the liquid accumulating in said chambers 22 and 24 may constitute a single body and may be removed through an opening closed by plug 33.

In the operation a suitable gaseous mixture containing discrete particles or vapors to be liquefied, flows through pipe 18 and device 19 where the swirling motion is imparted thereto, causing the frictional and rubbing action of the particles upon each other and upon the walls of chamber 16 at a temperature above the melting point and below the boiling point of the particles or vapors, whereby liquefaction takes place. The gases pass through opening 21 and into chamber 22 where the velocity is decreased, causing a further deposit of liquid and the gases then flow through tangential opening 23 and into chambers 24 and 25. A similar swirling action takes place therein, and due to the conical shape of the chamber 25, the velocity of the gases is maintained and in chamber 25 substantially all of the liquefiable material is removed along the walls 17, the residual gases passing out through opening 26 and pipe 27.

An apparatus of this type lends itself to great flexibility in the application of heat and control of temperature in that by a choice of varying sizes of heating elements or strips and their arrangement I am enabled to supply at will varying amounts of energy at varying temperatures along the length of the converting chamber and in that manner I am enabled to secure any desired degree of superheat in the liquefied metal as it leaves the liquefying chamber and enters the collecting or holding reservoir for liquid metal.

The choice of materials of which the liquefying chamber is to be constructed will obviously depend upon the nature of the material being treated. For a metal such as zinc a fire clay refractory chamber is satisfactory. When treating magnesium, iron, steel or certain ferrous alloys give satisfactory results. These latter materials, however, would be totally unsuited to the liquefaction of zinc powder and/or vapor. The material to be used will, therefore, be chosen with respect to the type and properties of the substance to be converted into the liquid state.

I find that the apparatus and method described herein are particularly valuable for another and somewhat analogous purpose, namely, the condensation of vapors to the liquid phase and more especially the condensation of metallic vapors to the liquid or solid states.

However, my method and apparatus are not limited in their application merely in conjunction therewith but are applicable to the condensation of metallic or other vapors however produced. They have the great advantage over methods depending on natural diffusion for successful condensation, in that the condensation rate is thereby very decidedly intensified. The condensation per unit of condensing area or per unit of volume of condensing apparatus is greatly increased with substantial savings in the cost of apparatus.

When condensing metallic vapor from an admixture with non-condensible gases I find that condensation of the last traces of metallic vapor may be accomplished by causing the mixture to suddenly expand preferably into a chamber separate from that in which the condensation in major part is effected.

Another advantage of my process is that the vapor with or without admixed gases passes progressively through the condensing apparatus smoothly and continuously without the drawbacks of other methods in that eddy currents are eliminated, recirculation over the same condensing surface is avoided and short circuiting or channeling is prevented.

I may use a hot or cold gas of inert or reducing character to act as an ejector of metallic vapors from a distilling or smelting apparatus and although the use of cold gas would ordinarily result in the production of discrete metallic particles, I can by my method and apparatus secure coherent metal directly by passing the ejecting gas and ejected vapor directly into the heated chamber in the manner described herein.

The high intensity or capacity of condensation, by virtue of the swirling, centrifugal and gravitational actions disclosed in my method, is such that I find I now have great latitude in the design of said apparatus. I may use instead of straight or uniformly tapered interior walls, curved surfaces and may so design the apparatus to secure constant velocity of travel therethrough or constant condensation per unit area. In my preferred method, however, I find it advantageous to operate with a gradually increasing velocity in the direction of travel in order to secure the maximum centrifugal effect and gradually increasing frictional and condensing effects as the content of metallic vapor in the admixture of vapor and gas becomes more dilute and as the temperature thereof becomes lowered.

Obviously, various modifications may be made in the type of apparatus to be employed in successfully practicing my method. For example, instead of a truncated conical form of apparatus I may use a spiral, tubular form of apparatus wherein the tubes may be of uniform diameter throughout or of progressively decreasing diameter in the direction of gas or vapor flow. Obviously other modifications will suggest themselves to those skilled in the art. While I have indicated electric heating means for the apparatus obviously other heating means may be employed with satisfactory results. While vertically positioned apparatus is preferred I do not wish to be limited thereto as inclined or horizontal arrangements can be used. It is not necessary that the cross-section of the treatment chamber be circular nor that it be uniformly tapered as similar effects can be obtained with various shapes and various cross-sections. For example, one may utilize a chamber of elliptical shape or one having angular wall faces, or one of irregular cross-section and the like. Other means for imparting a swirling motion to the gases than the devices shown in detail in Figures 3 and 6 may be used as, for example, the end of the pipe leading to the chamber may be fluted, bent, flattened or otherwise shaped to give the desired result. Although the method and apparatus are more especially directed to the treatment of magnesium powder, obviously it is applicable to and it is intended that it shall be broadly construed to cover metallic powders generally and any organic or inorganic powdered or vaporized material. These and other changes may be made within the spirit of my invention, the scope of which is set forth in the claims appended hereto.

What I claim is:

1. A method of treating liquefiable discrete particles to liquefy the same which comprises projecting the same against a surface covered with a film of liquefied substances maintained at a temperature above the melting point and below the boiling point of said substance to be liquefied to form a coherent body thereof.

2. A method of treating liquefiable discrete particles to liquefy the same which comprises projecting the same against a stationary surface maintained at a temperature above the melting point and below the boiling point of the substance to be liquefied to form a coherent body thereof.

3. A method of treating liquefiable discrete particles to liquefy the same which comprises projecting the same against a heated surface maintained at a temperature above the melting point and below the boiling point of the substance to be liquefied to form a coherent body thereof.

4. A method of treating liquefiable discrete particles to liquefy the same which comprises projecting a gaseous mixture including such particles against a surface maintained at a temperature above the melting point and below the boiling point of the substance to be liquefied to form a coherent body thereof.

5. A method of treating liquefiable discrete particles to liquefy the same which comprises projecting the same tangentially against a surface maintained at a temperature above the melting point and below the boiling point of the substance to be liquefied to form a coherent body thereof.

6. A method of treating liquefiable discrete particles to liquefy the same which comprises projecting the same against a surface maintained at a temperature above the melting point and below the boiling point of the substance to be liquefied to form a coherent body thereof, the angle of projection being such as to cause a frictional engagement of said particles with said surface.

7. A method of treating liquefiable discrete particles to liquefy the same which comprises imparting a whirling motion to and projecting the same against a surface maintained at a temperature above the melting point and below the boiling point of the substance to be liquefied, to form a coherent body thereon.

8. A method of treating liquefiable discrete particles to liquefy the same which comprises projecting a gaseous mixture including such particles against a surface maintained at a temperature above the melting point and below the boiling point of the substance to be liquefied, to form a coherent body thereof, expanding the residual gas and recovering liquid therefrom.

9. A method of treating liquefiable discrete particles to liquefy the same which comprises mixing with vapors an amount of gas at a temperature sufficient to cause the condensation of said vapors and formation of discrete particles, and projecting the same against a surface maintained at a temperature above the melting point and below the boiling point of the substance to be liquefied to form a coherent body thereof.

10. A method of treating liquefiable discrete particles of metals to liquefy the same which comprises projecting the same against a surface maintained at a temperature above the melting point and below the boiling point of the metal to form a coherent body of said metal.

11. A method of treating liquefiable discrete particles of magnesium to liquefy the same which comprises projecting the same against a surface maintained at a temperature above the melting point and below the boiling point of the metal to form a coherent body of magnesium.

12. A method of treating liquefiable discrete particles of metals to liquefy the same which comprises projecting the mixture of an indifferent gas with such particles against a surface maintained at a temperature above the melting point and below the boiling point of the metal to form a coherent body of said metal.

13. A method of treating liquefiable discrete particles of magnesium to liquefy the same which comprises projecting a mixture of an indifferent gas with such particles against a surface maintained at a temperature above the melting point and below the boiling point of the magnesium to form a coherent body of magnesium.

14. A method of treating liquefiable discrete particles of magnesium to liquefy the same which comprises imparting a whirling motion to and projecting a mixture of an indifferent gas with such particles against a surface maintained at a temperature above the melting point and below the boiling point of the magnesium to form a coherent body of magnesium.

15. An apparatus for treating liquefiable discrete particles which comprises a chamber of conical shape, an inlet for gases and vapors at one end thereof, an outlet for residual gases at the other end thereof, and a second chamber of conical shape, said outlet being connected thereto.

16. An apparatus for treating liquefiable discrete particles which comprises a chamber of conical shape, an inlet for gases and vapors at one end thereof, an outlet for residual gases at the other end thereof, a second chamber of conical shape, said outlet being connected thereto, and means for heating both of said chambers.

17. An apparatus for treating liquefiable discrete particles which comprises a chamber of conical shape and placed in an inverted position, an inlet for gases and vapors at the upper end thereof, an outlet for residual gases at the lower end thereof and a second chamber of conical shape, said outlet being connected to the lower end of said second chamber.

18. An apparatus for treating liquefiable discrete particles which comprises a chamber of conical shape and placed in an inverted position, an inlet for gases and vapors at the upper end thereof, an outlet for residual gases at the lower end thereof, and a second chamber of conical shape, said outlet being connected to the lower end of said second chamber and an enlarged chamber between and interconnecting said conical chambers.

FRANK R. KEMMER.